NUMERICAL TABULATOR

Filed Dec. 9, 1953 4 Sheets-Sheet 1

Inventors:
John F. Brinster
& Erwin Donath
BY Ralph K. Bonell
Agent.

July 15, 1958 J. F. BRINSTER ET AL 2,843,840
NUMERICAL TABULATOR
Filed Dec. 9, 1953 4 Sheets-Sheet 2
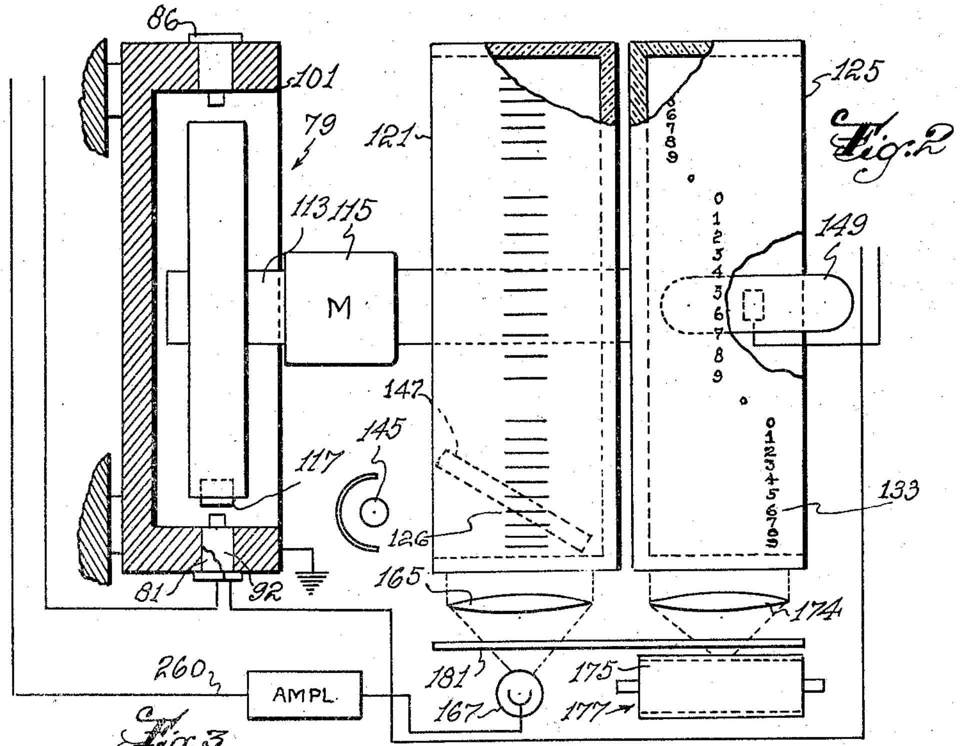
Fig. 2
Fig. 3
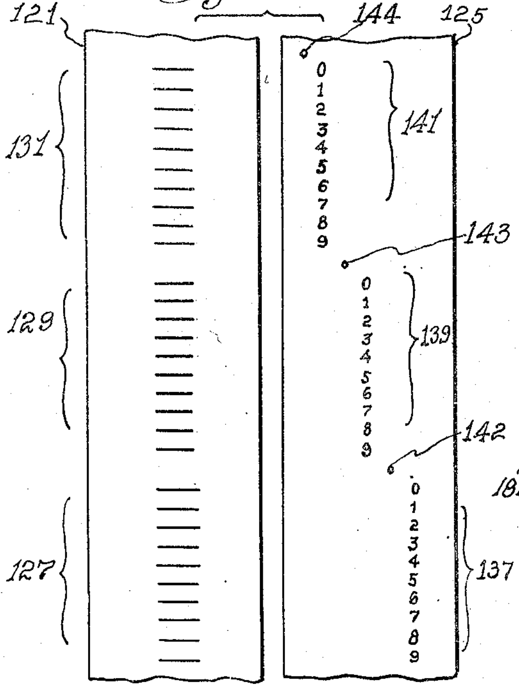
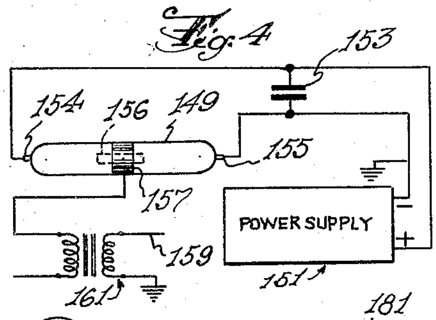
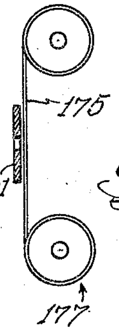
Fig. 5
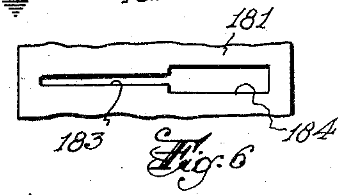
Fig. 6
Inventors
John F. Brinster
& Erwin Donath
BY Ralph K. Bonell
Agent.

NUMERICAL TABULATOR

Filed Dec. 9, 1953 4 Sheets-Sheet 3

Inventors:
John F. Brinster
& Erwin Donath
BY Ralph K. Bonell
Agent.

NUMERICAL TABULATOR

Filed Dec. 9, 1953 4 Sheets-Sheet 4

Inventors
John F. Brinster
+ Erwin Donath
BY Ralph K. Bonell
Agent.

United States Patent Office 2,843,840

Patented July 15, 1958

2,843,840

NUMERICAL TABULATOR

John F. Brinster and Erwin Donath, Princeton, N. J., assignors to Applied Science Corporation of Princeton, Princeton, N. J., a corporation of New Jersey Application December 9, 1953, Serial No. 397,189

14 Claims. (Cl. 340—173)

This invention relates to recording apparatus and more particularly to a method of and means for obtaining a printed numerical or analogous record of data occuring in electrical form.

In electrical computing and data processing apparatus wherein numerical values of the processed data are represented by selected characteristics of electrical impulses it is necessary, in order to recognize and preserve a record of the results of the operations performed to provide means for translating electrical information into a visual or like display. For example, successive values of the data, in electrical form, may be converted into corresponding distances from an origin and a graphical record made by plotting in sequence the points thus defined. A means for rapidly and automatically plotting a graph in the above manner, to display the characteristics of variable electrical data, is among the features disclosed in the co-pending application of the present inventors for "Plotter," Serial No. 377,092, filed August 28, 1953, assigned to the assignees of the present invention.

The apparatus of the present invention and the method of operation thereof are directed toward the automatic printing of digit symbols, or other characters, which represent or correspond to discrete values of variable input electrical data, rather than to the plotting of a continuous graph of the variations of such data. Thus, in its application to computers, the means of the invention supply an output record comprising a sequence of spaced multi-place numbers, automatically printed at a rapid rate, displaying the values of the input data at selected time intervals. This numerical record may, if desirable, be produced jointly with and appear on a common base with a graphical record of the same data supplied by the apparatus of application Serial No. 377,092, to furnish a means for readily identifying the ordinate values of selected points on said graphical record.

In another application, the printed symbols may be letters, each corresponding to a particular value of electrical input, and these may be combined into words or other forms of intelligence.

The operation of printing the output record, briefly, is as follows: Assuming input data in digital form, wherein an instantaneous datum value is represented by the count of a sequence of electrical impulses, this count is stored by a multi-stage decade counter, with each counting stage thereof registering the number, from zero to nine, that is to appear in the corresponding place of the output number. The number or count registered by a particular stage then determines the digit symbol selected for printing from a sequence of the symbols 0 to 9 appearing serially in printing position before projective photographic printing apparatus. In one form of the invention the digits of a multi-place number are printed in sequence while in another form multiple printing means are employed to print all digits substantially simultaneously, or within a very short time interval. Provision is made for the printing of a decimal point in selected relationship to the digits of the output number. Provision may further be made for setting the rate at which the data are sampled for printing purposes. An outstanding feature of the invention is the rapid rate at which symbols can be printed, an operating speed of fifteen (and more) four digit numbers with decimal point, per second, having been attained in practice.

While principally described herein with reference to the printing of numbers, the invention, as noted, contemplates the printing of other symbols and combinations of symbols. In such cases a sequence or sequences of the appropriate symbols is substituted in the printer for the above mentioned sequence of digit symbols.

It is an object of the invention to provide automatic means for printing symbols corresponding, respectively, to selected values of electrical data.

It is another object to provide means for rapidly recording numerical values of variable digital electrical data at selected time intervals.

Another object is to provide means for printing a decimal point in selected relationship to the component digits of a number recorded by the foregoing means.

Another object is to provide means for selecting a symbol in a space sequence of symbols corresponding, according to a pre-established relationship, to an impulse in a time sequence of electrical impulses.

Another object is to provide means for printing a sequence of numbers displaying the ordinate values of graphical data at selected intervals.

Another object is to provide means for translating electrical data into printed numerical data including in the process multiplication by a pre-selected factor.

A further object is to provide an improved method of tabulating numerical data.

Other objects and advantages of the invention will be apparent upon consideration of the following specification, taken in connection with the appended drawings, in which:

Fig. 2 is a front elevational view, partly in section, of the symbol-printing and control means of Fig. 1.

Fig. 3 is a partial developed view of the symbol and marker films of Figs. 1 and 2, showing the positional relationship between indicia thereon.

Fig. 4 is a diagram of a circuit for controlling the flashing of a discharge tube.

Fig. 5 is an end elevation (to a reduced scale) of the recording film drive and associated means of the invention.

Fig. 6 is a partial front elevation of a light mask.

The electrical data acceptable as an input to the translating and recording means of the invention may occur in the form of any one of a number of known types of modulation, including pulse-width modulation, wherein the instantaneous value of a variable quantity is represented by the duration of an electrical impulse, or its width along the time axis, and pulse-position modulation wherein the spacing or time interval between a pair of discrete impulses, themselves of short duration, portrays the desired information. Also included is the digital form of data representation wherein the number of impulses in a sequence of impulses is proportional to the instantaneous value of the data. In certain embodiments of the invention means are provided for converting pulse-width and pulse-position data to digital form, which is the type of input utilized by the symbol-printing means, proper, of the invention. Other types of modulation such as amplitude and frequency modulation may be converted to digital form by known means.

Figure 1:
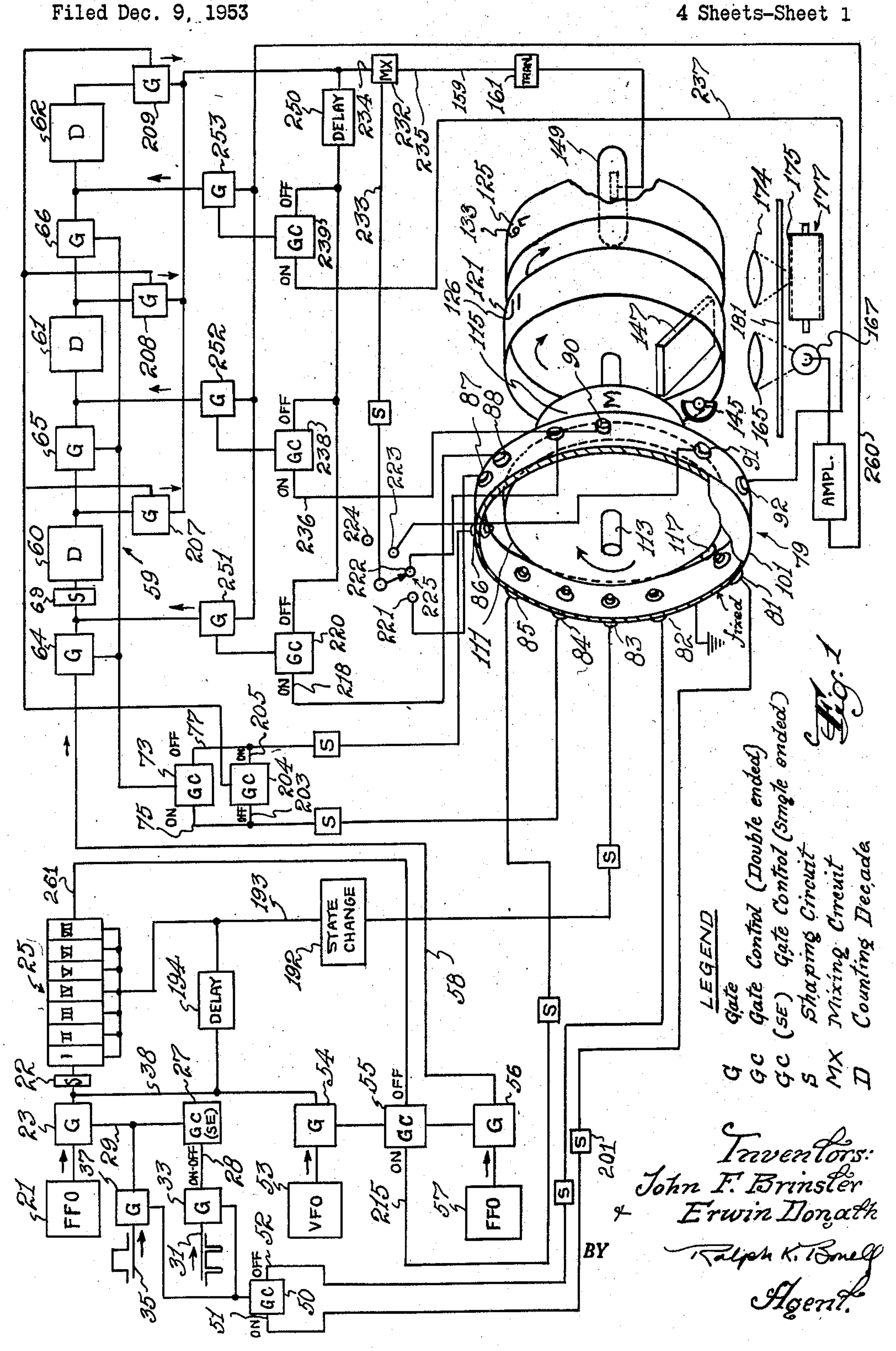
Fig. 1 is a combination perspective drawing and circuit diagram in block form showing one embodiment of the invention.
Figures 7, 8:
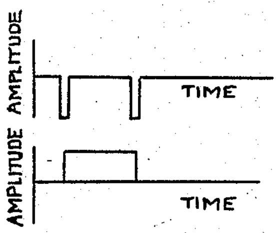
Figs. 7 and 8 are diagrams of electrical wave forms.

Referring, first, to Fig. 1, there are shown cooperative electrical, mechanical and optical means for carrying out the invention in one form thereof. For simplicity of illustration, component electrical circuits are shown chiefly in block form and interconnections are indicated by single lines, only. The functions of those blocks identified by letters are explained in a legend on the figure. In explanation of the use in the present invention of certain known types of circuits shown in block form in Fig. 1, brief reference will be made thereto before proceeding to the description of the complete circuit means of the figure.

Figure 9:
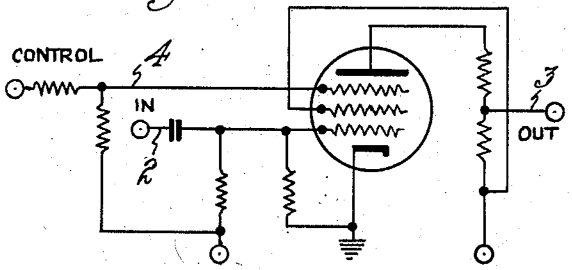
Fig. 9 is a circuit diagram of an electronic gate.

Fig. 9 illustrates a known circuit adapted to operate as an electronic gate, comprising a pentode having a control grid biased to cut-off (other conditions being suitable) so that normally no transmission path exists between "In" lead 2 and "Out" lead 3 thereof. Transmission can occur, in one direction only, if the potential of the number three grid (from the cathode) is raised by the application of a positive impulse of suitable amplitude to "Control" lead 4 connected thereto, and will continue for the duration of said impulse, the gate being "open" in this condition. Other types of gates may be employed, in carrying out the invention, to meet specific conditions.

Figure 10:
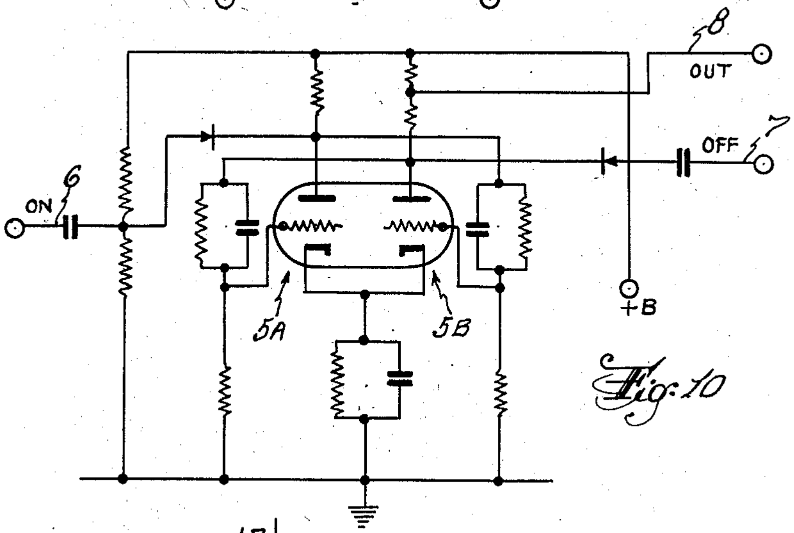
Fig. 10 is a circuit diagram of one form of electronic gate control.

Fig. 10 illustrates a known bistable circuit herein used as a "gate control" to govern the operation of an electronic gate of the type shown in Fig. 9. The circuit comprises triodes 5A and 5B interconnected by the characteristic cross-coupling of this type of circuit, together with "On" and "Off" leads 6 and 7, respectively, and output lead 8 adapted for connection to the "Control" lead of a gate, as lead 4 of Fig. 9. This circuit is operated from one stable state to the other by negative trigger impulses applied to leads 6 and 7, respectively, an input to lead 6 initiating conduction in triode 5A and non-conduction in triode 5B. With triode 5B cut-off, a relatively high positive potential appears on lead 8 which drops when this triode resumes conduction as a result of an input trigger on lead 7. The positive potential of lead 8 may be used to open a gate and hold it open during the persistence thereof, as by application to lead 4 of Fig. 9. Circuits similar to that of Fig. 10 employing magnetic elements, transistors, etc., in place of electronic elements are known and may be used.

Figure 11:
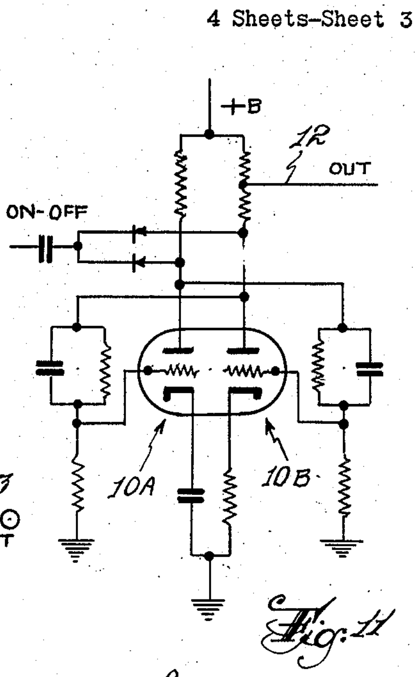
Fig. 11 is a circuit diagram of another form of gate control.

The type of gate control shown in Fig. 10 is herein termed "double-ended." A "single-ended" gate control operated by successive impulses applied to a single "On-Off" lead, is shown in Fig. 11. This, also, is a known bistable circuit, sometimes called a "scale-of-two," wherein one negative trigger impulse applied to "On-Off" lead 11 initiates conduction in triode 10A and cuts-off triode 10B while the next impulse reverses these operating conditions. With triode 10B cut off, the relatively high potential is applied to lead 12 can be employed to open a gate as in the case of the "double-ended" control of Fig. 10.

Figure 12:
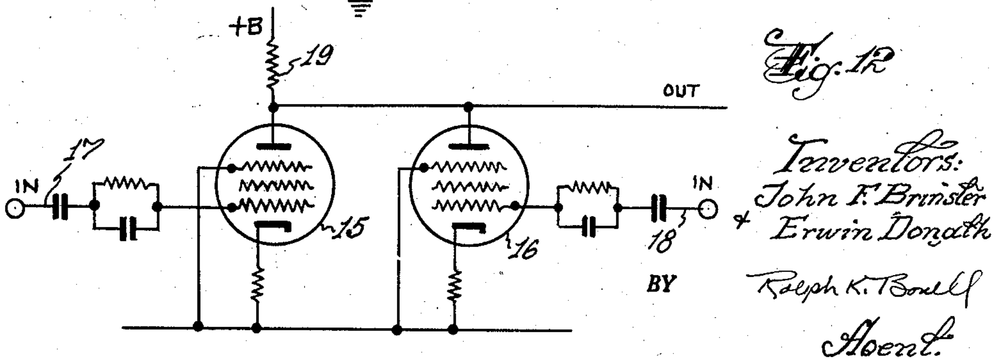
Fig. 12 is a diagram of a mixer circuit.

Fig. 12 illustrates a mixer circuit which is employed as a component of the circuit of the invention where an output is desired responsive to an input from either of two sources, without interaction between said sources, this circuit comprising two pentodes 15 and 16 with their plates connected in parallel. An input applied to either of the two control grid leads 17 or 18 produces an output as a voltage drop across common plate resistor 19.

Returning now to the showing of the invention in Fig. 1, fixed frequency oscillator 21, operating at a frequency chosen to suit operating conditions, is connected by way of shaping circuit 22 and gate 23 to a multi-stage binary storage counter 25. Illustrated as a seven stage counter, counter 25 has a maximum counting capacity of $2^7—1$, or 127. A number of types of binary counters using cascade arrangements of electronic or equivalent components connected in bistable "scale of two" counting circuits are known in the art. A preferred type of counter for use in the circuit of the present invention, is disclosed in the co-pending application of Brinster, Hill and Donath, for "Method of and Circuit for Counting Impulses," Serial No. 321,704, filed, 11–20–52, assigned to the assignees of the present invention and certain novel features of this counter will be referred to in describing the functions of counter 25.

The opening and closing of gate 23 to control the passage of impulses or oscillations from oscillator 21 to counter 25 may be effected in either of two ways: first, through the operation of "single-ended" gate control 27 and second, by the direct application of a positive impulse to "Control" lead 29 of the gate, the circuit of Fig. 9 being suitable for gate 23. When gate control 27 is employed, this is operated to control gate 23 in described manner by successive negative trigger impulses applied to "On-Off" lead 28, these impulses initially being applied to input lead 31 and passing to lead 28 when gate 33 is open. The application of a positive impulse directly to lead 29, without the operation of gate control 27, is brought about by the initial application of said impulse to input lead 35 and its passage to lead 29 when gate 37 is open.

The function of the above-described combination of means, briefly, is as follows: Assuming that at the start gate control 27 is in that operating state which holds gate 23 closed, and that gate 33 is open, the application of a negative trigger impulse to input lead 31 reverses the state of gate control 27, thereby opening gate 23 and allowing oscillations or impulses from oscillator 21 to pass to counter 25 for registration and storage thereby. A second trigger impulse applied to lead 31 returns gate control 27 to its original condition, thereby closing gate 23 and preventing further impulses reaching counter 25 from oscillator 21. Since oscillator 21 operates at a constant frequency, the count of impulses received by counter 25 in the interval between the occurrence of the two successive impulses applied to lead 31 is proportional to that interval. By the described means pulse position data applied to lead 31 are translated into digital form and applied to counter 25 for registration and storage thereby. In the alternate method of control of gate 23 by the application of a positive impulse directly to lead 29, the count of impulses reaching counter 25 from oscillator 21 is proportional to the duration of said positive impulse, means thereby being provided for the translation of pulse-width or pulse-duration data into digital form, and for the storage thereof.

Gates 33 and 37 both are under the control of "double-ended" gate control 50 having "on" and "off" leads 51 and 52, respectively. In addition to constant frequency oscillator 21, a variable frequency oscillator 53 is provided as a source of input impulses to counter 25, impulses from oscillator 53 being applied by way of gate 54 under the control of gate control 55. Gate 56, likewise under the control of gate control 55, permit impulses from a second constant or fixed frequency oscillator 57 to pass by way of lead 58 to a three stage decade counter 59 of known design comprising decade or "scale of ten" cyclically operable counting stages 60, 61 and 62 respectively, having associated therewith in the direct transmission path therethrough, isolating gates 64, 65 and 66 and shaping circuit 69. Each of the last-named gates is controlled by gate control 73 having "on" and "off" leads 75 and 77, respectively.

Cascade-connected counting decades 60, 61 and 62, counting units, tens and hundreds, respectively, each comprises a circuit for registering a count of impulses from zero to nine and for supplying in known manner an output impulse to a succeeding stage or other output circuit upon the occurrence of a tenth input impulse. Three stage counter 59, shown by way of example, is thus adapted for counting to 999, according to the decimal system of numeration.

The occurrences of the events which constitute the data translation and printing operations of the invention are governed by impulses originating in the illustrated example, at a stationary sequence disc 79 bearing twelve electro-magnets 81 to 92, inclusive, irregularly spaced around an axially-extending flange 101 thereof. Each of said magnets comprises a core of magnetic material together with a winding thereabout. The spacings of these electro-magnets in the drawing are for clarity of illustration, only. Actual spacings are determined by factors which will better be understood upon consideration of the operation of this portion of the invention, later to be described. Co-axial with flange 101 is a disc 111 mounted on the shaft 113 of a constant-speed electric motor 115 or geared thereto, for rotation therewith. Disc 111, of non-magnetic material, carries a permanent magnet insert 117 projecting radially therefrom whose exterior surface rotates in close proximity to the inwardly projecting pole pieces of electro-magnets 81—92, for the purpose of developing electrical impulses in the respective windings of said magnets by magnetic induction upon transit past the pole pieces of the magnets. The combination of means 111, 81—92 serves to supply recurrent impulses synchronized with selected phases of the rotation of disc 111 for controlling the operation of the apparatus and is by way of general illustration of a commutator that may be replaced by other commutating means, such as a switch and associated source of voltage.

Also mounted on shaft 113 for rotation therewith are marker drum 121 and symbol drum 125. Drum 121 is of transparent material, such as a clear plastic, and bears indicia around the periphery thereof in the form of axially-extending opaque marker lines, exemplified by line 126, arranged in three spaced groups 127, 129 and 131 of ten lines each. A portion of the developed surface of the drum, including the marker lines, is shown in Fig. 3. The lines may be formed directly on the surface of the drum or produced photographically on a film, later wrapped about the drum.

Drum 125, also of transparent material, bears around its periphery a plurality of opaque digit symbols, exemplified by the symbol referenced 133. These symbols are arranged in three staggered groups 137, 139 and 141 (Fig. 3), each group comprising the sequence of digit symbols 9 to 0, inclusive. The staggering of the three groups, axially, provides for the printing of the digits of a three-place number in appropriate relative positions, one digit being printed from each group. The angular spacing of the symbols and of the groups, about the drum, is determined by design considerations relating to the time intervals between the printing of successive numerals. Each digit symbol is in axial alignment with a marker line on drum 121 and the total peripheral extent of marker lines and symbols, therefore, is the same.

Preceding each digit symbol group in axial position and circumferentially spaced therefrom, is a decimal point symbol, the three symbols being referenced 142, 143 and 144, respectively. The selection of one of these symbols to print the decimal point in a particular number is under the control of means later to be described.

A continuously illuminated lamp 145 provides a source of illumination for the fields of marker groups 127, 129 and 131, light from this lamp being reflected through the surface of the drum by a mirror 147, supported within the drum by means not shown. Illumination for digit symbol groups 137, 139 and 141 is provided by a flash lamp 149 whose flashing is controlled by a circuit shown in Fig. 4. In this circuit lamp 149 which contains a gas, such as mercury vapor at low pressure, is electrically biased by power supply 151 to a potential just below the ionization point of the gas. A condenser 153 of large capacity is connected across this supply and the principal electrodes 154, 155 of the lamp. In addition to electrodes 154, 155, lamp 149 is provided with an auxiliary contact 156 on the external surface thereof to which connection is made by a clip 157. An electrical impulse applied to the biased lamp by way of lead 159, step-up trransformer 161, clip 157 and contact 156, if of suitable amplitude and polarity, intensifies the electro-static field acting on the gas to a degree causing ionization, thereby permitting the discharge of condenser 153 through the gas and the production of an intense flash of a few micro-seconds duration.

An optical system, illustrated as lens 165 (Fig. 1) images, in reduced ratio, a portion of the illuminated area of the surface of drum 121 on phototube 167. (The spacings of these and other similar members are greatly reduced in the drawing.) When this image, restricted in effective area as later described, includes one of the opaque marker lines of groups 127, 129 or 131, the illumination of phototube 167 is reduced, thereby reducing its electrical output, this dip in output constituting a negative electrical impulse. A second optical system, illustrated as lens 174, projects a reduced image of a portion of the surface of drum 125 onto a sensitized paper or film 175, serving as a record base, mounted on driving means 177, shown in more detail in Fig. 5. When the effective field of projection includes one of the digit symbols of groups 137, 139 or 141, a photographically developable image of that digit is produced on paper 175. Sensitive paper not requiring development also may be used.

A mask 181 shown in partial front elevation in Fig. 6, restricts the effective extent of the projected images of drums 121 and 125 at paper 175 and phototube 167, respectively. Mask 181 has a narrow aperture or slit 183 in the portion thereof adjacent phototube 167 and a somewhat wider aperture 184 in the portion adjacent paper 175. Aperture 183 accommodates the image of a single marker line and aperture 184 the image of a single digit symbol. The symbol whose image is projected on paper 175 through aperture 184 is said to be in printing position. Traverse of paper 175 past mask 181 is by the operation of a motor, not shown, for paper drive 177. The rate of travel is slow relative to the number-printing rate so that mis-alignment of digits in a printed number is negligible.

Each of the ten marker lines of group 127, for example, is, as previously noted, in alignment with one of the ten digit symbols of group 137 and a similar relationship exists between marker lines and digits of the other groups. The marker lines thus individually identify the positions of the digit symbols, to the end that downward modulation of the light reaching phototube 167 as a result of the transit of each projected line past aperture 183 of mask 181 may occur in synchronism with the appearance of a particular digit symbol in printing position. Marker line 126, for instance, is shown aligned with the digit symbol referenced 133.

The described combination of marker lines, light source and phototube is by way of illustration of scanning or counting means for obtaining a time sequence of electrical impulses, responsive to rotation of drum 121, having a count representative of the position of a digit symbol in a space sequence of such symbols and may be replaced by equivalent known means, such as electro-static or magnetic pick-ups or by a switch and associated source of voltage. Also, while for convenience described as separate supports, in practice a single rotatable support may replace drums 121 and 125.

The relationship between the direction of rotation of drums 121 and 125 and the order of appearance in printing position of the digits of groups 137, 139 and 141, is such that the digits progress in printing position from 9 to 0. Thus, the digit 9 of group 137 is aligned with the first marker line of group 127 to modulate the output of phototube 167, while the digit 0 is aligned with the last line of the group.

Returning to consideration of the means whereby control of the data translation and printing operations is exercised by impulses originating at sequence disc 79, magnets 81 to 92, inclusive, have one terminal, each, of their respective windings (not shown) connected to the common circuit ground. In the case of magnet 81 the other terminal is connected to "On" lead 51 of gate control 50, preferably by way of a shaping circuit 201, interposed for the purpose of modifying the impulse derived from the transit of permanent magnet 117 across the pole piece of magnet 81 to obtain a negative impulse of suitable shape for the actuation of a gate control. Shaping circuits may include clippers and other appropriate known means. Such circuits, not referenced, are shown for modifying the impulses derived from the other magnets of the group 81–92, inclusive.

Magnet 82 is connected to the "Off" lead 52 of gate control 50. Magnet 83 is connected to a state change circuit 192. The purpose of circuit 192 is to furnish a so-called "state change impulse," which is a negative impulse of short duration, simultaneously to each of the seven counting stages of binary storage counter 25, upon the application of an input impulse thereto, said state change impulse being adapted to reverse the operating states of the bistable counting circuits and thereby cause counter 25 to register the complement (with respect to the capacity of the counter) of the count previously stored thereby, that is, the difference between the maximum count and the stored count. A more detailed disclosure of a state change circuit and its use in connection with a binary counter to reverse the states of the stages thereof is to be found in application Serial No. 321,704, previously referred to.

Output lead 193 of circuit 192, branched to the seven stages of counter 25 for the application of state change impulses individually thereto, is further connected to a delay circuit 194 of suitable known type, whose output is applied by way of lead 38 to the input of counter 25. By these means a state change impulse applied to lead 193, in addition to causing counter 25 to change its registration to the complement of the previously stored count, after a delay sufficient to permit said change to take place applies a single impulse to the counter input causing the then stored count to be advanced one unit, for purposes to be referred to later.

Magnet 84 is connected, by way of a shaping circuit to "On" lead 75 of gate control 73 and "Off" lead 203 of gate control 204 while magnet 86 is connected to "Off" lead 77 of gate control 73 and "On" lead 205 of gate control 204. As noted, gate control 73 governs the operation of isolating gates 64, 65, and 66 connected in cascade with decade units 60, 61 and 62 of counter 59. Gate control 204 governs the operation of gates 207, 208 and 209, in circuits branched from the principal circuit through counter 59. From the manner in which the "On" and "Off" leads of gate controls 73 and 204 are connected, it will be apparent that gates 64, 65, 66 are open when gates 207, 208, 209 are closed and vice-versa.

Magnet 85 is connected to "On" lead 215 of gate control 55 while magnet 88 is connected to "On" lead 218 of gate control 220. Magnets 87, 89 and 91 are in connection, respectively, with three contacts, 221, 222 and 223, of a three-position decimal-point selector switch 225 whose arm is connected, by way of a shaping circuit, to mixer circuit 232. Circuit 232 is adapted to receive an input from either of leads 233 or 234 and to deliver an output to lead 235. A mixer circuit suitable for use in the foregoing manner is shown in Fig. 12, of which a description has previously been given.

Magnets 90 and 92 are connected to "On" leads 236 and 237, of gate controls 238 and 239, respectively. The "Off" leads of gate controls 220, 238 and 239 are joined together and connected to the input of a delay circuit 250, having a delay of the order of micro seconds, whose output is connected to lead 234. Gate controls 220, 238 and 239 control gates 251, 252 and 253, respectively, for regulating transmission therethrough as indicated by arrows.

The operation of the embodiment of the invention shown in Fig. 1 will best be understood by tracing the steps taken in printing a single three-place number corresponding to an instantaneous value of variable electrical input data to be displayed in numerical form. By way of example let this number be 1.08. If the data are supplied in pulse position form, this value will be represented by the spacing, in time, of the occurrences of a pair of successive impulses (preferably negative impulses) of short duration applied to input lead 31. The interval during which impulses so applied can reach gate control 27 is determined by a pair of spaced impulses derived, respectively, from magnets 81 and 82, upon the passage of permanent magnet 117 thereby, the first of said impulses causing gate control 50 to open gate 33 and the second causing said gate control to close gate 33. The gating controlled by magnets 81 and 82 reduces the possibility of unwanted impulses and noise reaching gate control 17 during the remaining portion of the revolution of magnet 117.

Assuming that the two above-referred-to successive data impulses are applied to lead 31 while gate 33 is open, and that gate 23 initially is held closed by gate control 27, the first of said impulses causes "single ended" bistable gate control 27 to change its state and thereby open gate 23 by applying to lead 29 a positive impulse which persists until the second of the data impulses is applied to lead 31, to cause gate control 27 to revert to its initial state and thereby close gate 23. Since the opening of gate 23 depends only on the existence of a positive potential of suitable amplitude on lead 29, data whose values are represented by the duration of positive impulses (pulse width data) applied to lead 35 can, as has been noted, govern the operation of this gate as well as pulse position data applied to lead 31, assuming that gate 37, as well as gate 33 is open.

The frequency of constant frequency oscillator 21 is selected to bear a relationship to the duration of the open period of gate 23 such that during this period there is applied to binary counter 25 a sequence of impulses whose count equals the selected value of the data, in the present instance, 108 (the decimal point being neglected at this stage of the description). Operation based on numbers proportional but not equal to data values may be employed but will not be described herein. Representing the alternate values of each of the seven binary counting stages of counter 25 by the digits 0 and 1, as is customary in binary notation, the three place decimal number 108 may be written as the seven place binary number 1101100, which is the manner of its registration by counter 25. The foregoing proceedure is termed "read-in" of the count.

Upon the occurrence of an impulse originating at magnet 83, as a result of the passage of magnet 117 thereby, state change circuit 192 applies a state change impulse to each of the counting stages of counter 25 causing them individually to change their operating states and thereby reverse their registration. The registered count, in binary form, them becomes 0010011. This is the number 19, the complement of the original count 108 with respect to the capacity, 127, of the counter.

After the short delay, of the order of micro-seconds, introduced by delay circuit 194, a single impulse, derived from the state change impulse, is applied to the input of counter 25, the binary form of the count then changing to 0010100, the number 20.

The next occurring impulse from sequence disc 79 during the rotation of magnet 117, is generated in the winding of magnet 84 and is applied to "On" lead 75 of gate control 73 and "Off" lead 203 of gate control 204 to open gates 64, 65, 66 and close gates 207, 208, 209, respectively.

The succeeding impulse, from magnet 85, applied to "On" lead 215 of gate control 55 causes this control to open gate 54 and permit impulses from variable frequency oscillator 53 to pass to counter 25. These impulses continue until counter 25 has reached its counting capacity of 127 and then has received one impulse more, or a total number of 128 impulses. The last unit impulse, in the manner referred to in application Serial No. 321,704, causes stage VII, the last stage of counter 25, to supply an impulse to output lead 261, the "Off" lead of gate control 55, thereby causing said control to close gate 54 and preventing further impulses reaching counter 25 from oscillator 53. At the same time counter 25 reverts to its re-set condition, the counter as described in said application Serial No. 321,704 operating in a cyclical manner whereby after reaching capacity a further unit input resets the counter to a count which may be zero. Since the count stored by counter 25 before gate 54 was opened was 20, the number of impulses supplied to reach a total of 128 while this gate remains open is 108 the original count before state change. In the above described process of retrieving the original count, the count is said to be "read out" of counter 25.

While gate 54 is open, gate 56 also is open, both being governed by gate control 55, thereby permitting oscillations or impulses from constant frequency oscillator 57 to pass to decade counter 59. During this period gates 64, 65, 66 are open and gates 207, 208, 209 closed. If the frequency of oscillator 57 is the same as that of oscillator 53, the original count of 108 will be registered and stored, in decimal form, by counter 59. However if these two frequencies are not the same, a different count will be registered. Thus, by the choice of an operating frequency for variable frequency oscillator 53 different from that of constant frequency oscillator 57, multiplication or division of the data by a selected factor may be effected in the process of printing of a numerical record. Further disclosure of such transformations is made in application Serial No. 321,704.

Assuming the count to have been stored by counter 59 as the three-place decimal number 108, the next controlling impulse from sequence disc 79, that originating in the winding of magnet 86, is applied to "Off" lead 77 of gate control 73 and "On" lead 205 of gate control 204, to cause the closing of gates 64, 65, 66 and the opening of gates 207, 208, 209, respectively. Counter 59 is now prepared for read-out.

When magnet 88 supplies an impulse to "On" lead 218 of gate control 220, gate 251 is opened and shortly thereafter, as drum 121 rotates in synchronism with disc 111, the image of the first line of group 127 modulates the output of phototube 167 to apply a negative impulse to lead 260 and thence to decade 60 of counter 59, thereby advancing by one unit the count registered by said decade. Up to the counting capacity of the decade, succeeding lines similarly advance the count, one unit at a time. It is characteristic of the decade that whenever a count of nine, its counting capacity, is reached the tenth or next unit impulse, in addition to resetting the decade, causes the appearance of an output impulse or signal. In the presently described operating condition, gate 65 being closed and gate 207 open, upon the occurrence of a tenth input impulse the resulting output impulse from decade 60 passes by way of gate 207, lead 234 and mixer circuit 232, to flash lamp 149, resulting in the flashing of said lamp and the printing of that digit of group 137 which is in printing position. Since, in the numerical example being considered, decade 60, before read-out, already stored a count of 8 (the numeral is the right-hand place of the number 108), it is the second impulse derived from the transit of the images of the marker lines of group 127 past phototube 167 that causes lamp 149 to flash. At the instant this occurs the digit 8 of group 137, being the second of the sequence 9 to 0, is in printing position and is printed in the location, on paper 175, of the right-hand place of a three-place output number. It is herein considered, for convenience of explanation, that the joint effect of the optical system illustrated as lens 174 and position of paper 175 in reading the output record, results in the digits of a printed number appearing in the relative lateral positions of the groups from which they were selected, as seen in Fig. 3.

In the case of decade 61, the count stored before readout was 0. Ten impulses, derived from the marker lines of group 129, accordingly, are required for read-out, which is initiated when an impulse from magnet 90 opens gate 252 through the operation of gate control 238. Gate 66 at that time is closed and gate 208 open. The entire sequence of digit symbols of group 139, from 9 to 0, now passes through the printing position before an output printing impulse is supplied by decade 61, which time the digit 0 is in position and is printed on paper 175 to the left of the previously printed digit 8. Similarly, when an impulse from magnet 92 opens gate 253, through the operation of gate control 259, gate 209 being open, nine impulses derived from the marker lines of group 141 are required to read-out the stored count of 1 from decade 62. This sequence of nine impulses is completed when the symbol 1 of group 141 is in printing position and the digit 1, therefore, is printed in the left-hand place of the output number, which, so far as has been described, would appear as 108.

It will be apparent from the above example that the number of impulses required to read out a count stored by one of decades 60, 61, 62, is the complement of the stored count with respect to the number ten, termed the "tens complement," that is, the difference of these two numbers. Also, that as the count of read-out impulses increases, the value of the digit synbol in printing position decreases. In counting the number of symbols passing through printing position the starting point or origin thus is a point just ahead of the highest valued rather than the lowest valued digit. The flashing of lamp 149 at the completion of read-out signifies that a comparison of the count of impulses stored by a decade and the count of impulses derived from the marker lines of the corresponding group has been made and a pre-established relationship between the two counts recognized, said relationship being equality of the complement of the stored count and the count of the marker line impulses. Due to the arrangement of the digit symbols in retrogressive order, said relationship provides that the printed digit represents the count stored by the decade.

The position in which the decimal point is printed in the output number, if at all, is governed by the preselected active contact of switch 225, and this position remains the same until a new switch contact is selected. If, as in accordance with the requirements of the foregoing example, this point is to occur after the numeral in the left-hand place of each output number, before the printing operation starts the arm of switch 225 is positioned to connect contact 222 to lead 233. An impulse from magnet 90, due to transit of permanent magnet 117 thereby, then passes to flash tube 149 by way of shaper 230, lead 233, mixer circuit 232 and lead 235.

The phasing of the decimal point markings 142, 143 and 144 on the surface of drum 125 is such that at the instant the flash occurs under these conditions, decimal point symbol 143, intermediate in axial position of groups 137 and 139, is in printing position and therefore is printed to the right of the left-hand numeral, in the present example the numeral 1, of the output number. The complete printed number therefore appears as 1.08, the originally selected instantaneous value of the data.

An impulse from magnet 88 with the arm of switch 225 on contact 221 would have caused the printing of the decimal point one place to the left of that of the foregoing example while an impulse from magnet 92 with switch contact 223 as the selected contact would have shifted the point one place to the right. With the switch arm on blank contact 224, no decimal point is printed.

The repetition rate of the printing of the output numbers is, in the described embodiment of the invention, dependent upon the speed of operation of motor 115, which may be selected or adjusted in accordance with limitations imposed by the operational characteristics of various components of the assembly. If the apparatus of the present invention is used in conjunction with that disclosed in previously referred-to application Serial No. 377,092, or a portion thereof, as, for example, when the input to lead 21 or 25 is derived from the periodic scanning of a graphical record of data by means disclosed in said application, the printing of the numerical values of the data will, of necessity, be co-ordinated with the scanning rate. Wide latitude of adjustment of printing rates is feasible.

Figure 13:
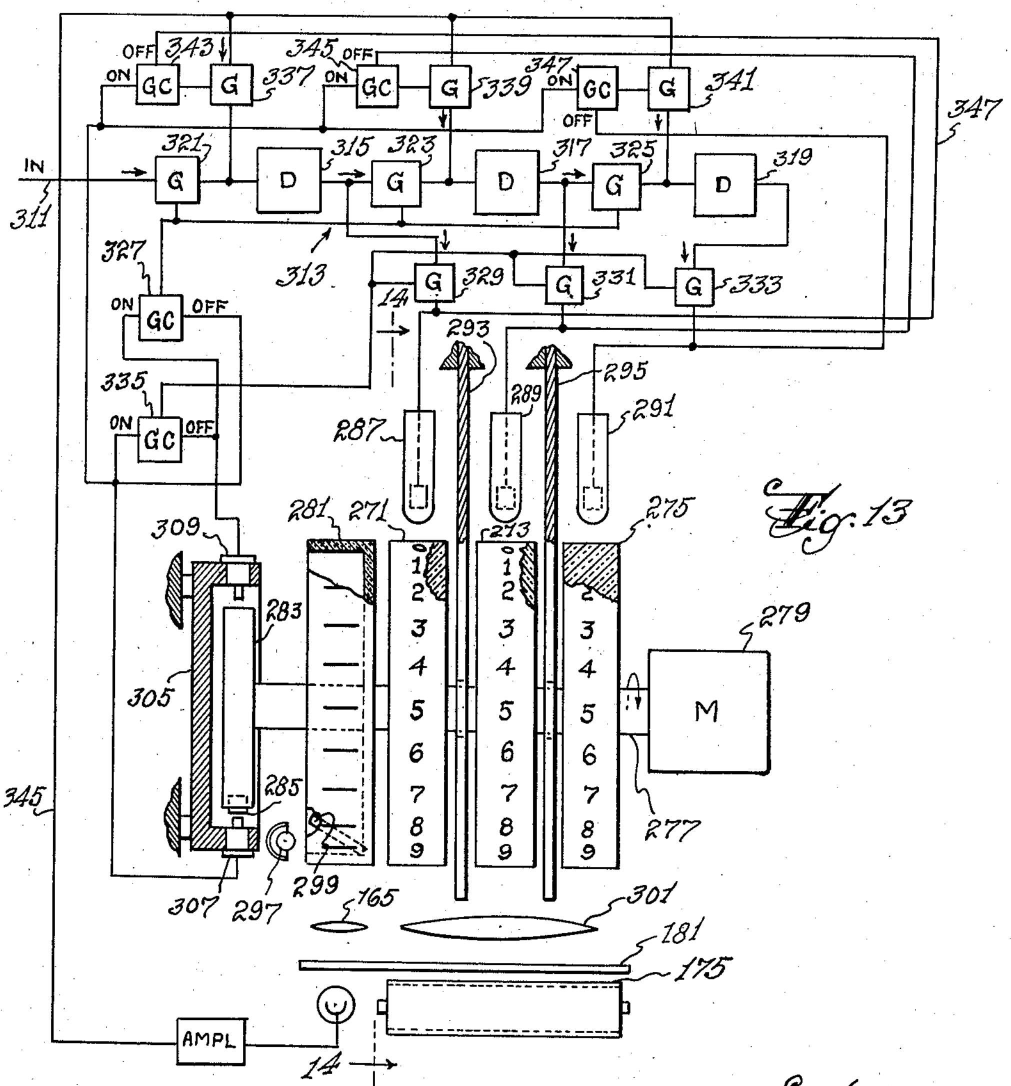
Fig. 13 is a plan view of a modification of the printing means of Fig. 2, including a diagram of associated circuit means.
Figure 14:
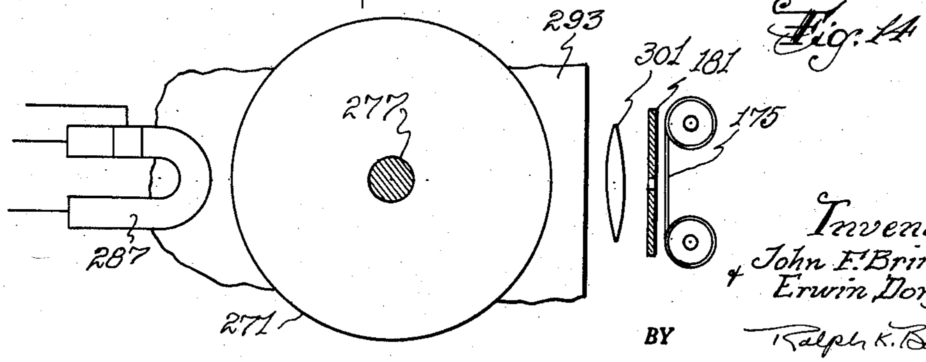
Fig. 14 is a sectional view taken along the line 14—14 of Fig. 13.

Figs. 13 and 14 illustrate a modification of the invention wherein the symbol sequences employed in printing a multi-place number are displayed in parallel on a plurality of coaxial solid discs instead of serially about the periphery of a single drum, to the end of that all digits comprised by the number may be printed during the period occupied by the passage of a single symbol sequence, 9 to 0, through the printing position. This method of operation differs from that of the means of Fig. 1 wherein one digit, only, is printed during the passage of a symbol sequence.

Three symbol discs 271, 273 and 275, of transparent material are shown mounted on a common shaft 277 driven by motor 279. Also mounted on shaft 277 are transparent marked drum 281 and a disc 283, the latter of non-magnetic material and bearing a permanent magnet insert 285. Each symbol disc bears a single sequence of opaque digit symbols 9 to 0 and marker drum 281 bears a single sequence of ten opaque marker lines, like digits on the several symbol discs being aligned one with another and with a marker line on drum 281. Illumination of the fields of the symbols on discs 271, 273 and 275 is provided by flash lamps 287, 289 and 291, respectively, here shown as of U shape. Light baffles 293 and 295 are provided to prevent cross-illumination. The symbol sequence on each disc extends over less than half the periphery of the disc and by forming the discs of a material such as "Lucite" light may readily be transmitted diametrically through the disc body to the far surface thereof for the printing of a digit symbol. Illumination of the field of the marker lines on drum 281 is provided by means similar to those shown in connection with drum 121 of Fig. 1, comprising permanently illuminated lamp 297 and mirror 299. An optical system illustrated as lens 301 images portions of the near surfaces of the symbol discs on record paper or film 175, through aperture 184 of mask 181. The means for imaging the near surface of drum 281 on phototube 167 may be that of Fig. 1, namely, lens 165. Lamps 287, 289 and 291 are flashed by applying trigger impulses to axilliary electrodes thereof, as electrode 303, the lamps being initially electrically biased as in the case of lamp 149.

Disc or drum 305, corresponding to disc 79, mounts a pair of electro-magnets 307 and 309 in the windings of which the control impulses for the presently described modification of the invention are generated upon passage of permanent magnet 285 thereby. The positions of magnets 307 and 309 are such that permanent magnet 285 passes magnet 307 before the three digit symbols 9 arrive in printing position and passes magnet 309 after the three symbols 0 have left this position. Rotation is shown by an arrow.

The control circuit of Fig. 13 is similar in principle of operation to that of Fig. 1 but differs in detail therefrom. "In" lead 311 corresponds, generally, to lead 58 of Fig. 1 and is adapted to receive a sequence of data impulses from a suitable source. A count thereof is stored by decade counter 313 (corresponding to counter 59) comprising counting decades 315, 317 and 319 and is read out by impulses developed by the marker lines on drum 281.

A gating system is employed to set-up a cascade connection of decades 315, 317 and 319 during read-in of the count of input impulses and subsequently to permit individual read-out of the numbers stored by each decade. This gating system comprises gates 321, 323 and 325 for isolating the decades one from another during read-out, said gates being controlled in common by gate control 327. Also, gates 329, 331 and 333, controlled by gate control 335, to govern the application of flashing voltages to lamps 287, 289 and 291, respectively, and isolating gates 337, 339 and 341 controlled, by gates controls 343, 345 and 347, respectively. Gate controls 327 and 335 are interconnected so that an impulse applied to the "On" lead of one is simultaneously applied to the "Off" lead of the other.

In the operation of the arrangement of Fig. 13, assuming as the start of the operating cycle a phase of the rotation of shaft 277 at which permanent magnet 285 has just passed electro-magnet 307, the impulse developed by subsequent transit past magnet 309 applied to the "On" lead of gate control 327 opens gates 321, 323 and 325 and applied to the "Off" lead of gate control 335 closes gates 329, 331 and 333. Gates 343, 345 and 347 are assumed to be in a closed condition as a result of read-out during the preceding cycle, as will later be described. Counter 313 is now prepared for read-in and will register and store a count of a sequence of impulses applied to "In" lead 311, this sequence to terminate before permanent magnet 285 reaches magnet 307. Upon transit past the last-named magnet, the impulse generated in the winding thereof applied to the "Off" lead of gate control 327 closes gates 321, 323 and 355, isolating the several decades. Applied to the "On" lead of gate control 335 the same impulse opens gates 329, 331 and 333 and applied to the "On" lead of gate controls 343, 345 and 347 it opens gates 337, 339 and 341, respectively. The counter is now prepared for read-out.

A sequence of impulses resulting from the modulation of the output of phototube 167 by the images of the marker lines on drum 281 is simultaneously applied, by way of lead 345 and gates 337, 339 and 341, to the inputs of decades 315, 317 and 319. The decade initially storing the highest count is the first to pass its counting capacity as a result of this additional input and supply an output impulse to its associated flash lamp, causing flashing of the lamp and the printing of the digit symbol then in printing position on the symbol disc illuminated thereby. The decade storing the next highest count will next be read out, and so on.

Using the numerical example chosen for explanation of the means of Fig. 1 (but omitting the decimal point, for simplicity), if counter 313 initially stores a count of 108, the numbers individually stored by decades 315, 317 and 319 are 1, 0 and 8, respectively. Two impulses are therefore required to read out decade 319 and digit symbol 8 on disc 271 is printed. The ninth impulse reads out decade 315 and prints the digit 1 on disc 275 while the tenth impulse reads out decade 317 and prints the digit 0 on disc 273. Thus the complete number 108 is printed during the interval required for the passage through printing position of only one sequence of digit symbols 9 to 0.

As lamp 287, for example, is flashed and a numeral printed, the triggering impulse therefor is applied, also, to the "Off" lead of gate control 343 by way of lead 347, thereby closing gate 337 and preventing any further impulses reaching decade 315 from phototube 167. Similarly, inputs to the other decades are terminated or blocked upon the printing of the numerals corresponding to the counts individually stored thereby. Counter 313 is thereby partially restored to a condition suitable for read-in and the process is completed when magnet 285 again passes magnet 307.

The embodiments of the invention described herein are by way of illustration, only, and not by way of limitation, the scope of the invention being defined in the appended claims.

We claim:

1. In apparatus for recording symbols respectively corresponding to discrete values of variable electrical data the combination of means supplying a first sequence of electrical impulses representing a multi-place value of said data, means for storing said sequence, a support displaying symbols arranged in series, spaced means respectively aligned with said symbols defining the positions thereof, means responsive to said space means for supplying a second sequence of impulses, means for producing relative displacement between said spaced means and said last mentioned supplying means, said second sequence having a count proportional to the count of said spaced means from an origin, means for comparing said second sequence with the stored impulses of said first sequence representing different places of said value, and means for recording a symbol of said series responsive to a pre-established relationship between the counts of said second sequence and said last-mentioned impulses, said symbol being uniquely defined by said relationship.

2. In apparatus for recording symbols respectively corresponding to discrete values of variable electrical data the combination of means supplying a first sequence of electrical impulses, a cyclically operable counter for storing said sequence, a support displaying symbols arranged in series, spaced means respectively aligned with said symbols defining the positions thereof, means responsive to said spaced means for supplying a second sequence of impulses, means for producing relative displacement between said spaced means and said last-mentioned supplying means, said second sequence having a count proportional to the count of said spaced means from an origin, circuit means for applying said second sequence to said counter to read-out a portion of the count stored thereby, and means connected to said counter and responsive at the completion of read-out for recording the symbol of said series aligned with the one of said spaced means having a predetermined position with respect to said last-mentioned supplying means upon completion of read-out, said recording means comprising a sensitized support and means for projecting an image of said last-named symbol thereupon.

3. In apparatus for recording symbols respectively corresponding to discrete values of variable electrical data the combination of a cyclically operable, multi-section counter for storing a count of electrical impulses, each section of said counter furnishing a signal upon re-set responsive to exceeding the maximum count thereof by one unit, a source of data impulses to be supplied to said counter, a rotatable support displaying a series of symbols about its periphery, means for rotating said support, means defining a printing position for said symbols, means for generating a sequence of impulses having a count determined by the number of said symbols passing through printing position from an origin upon rotation of said support, circuit means for applying said sequence to the sections of said counter to read-out the count stored therein, and means controlled by said signal for printing the symbol in printing position upon the occurrence of said signal, comprising projective photographic printing apparatus actuated by an electrically biased flash tube having an auxiliary triggering electrode and circuit means applying an impulse derived from said signal to said electrode for triggering said tube.

4. In apparatus for recording symbols respectively corresponding to discrete values of electrical data the combination of a displaceable record base, means for displacing said base, a support displaceable relative thereto and displaying a plurality of symbols arranged in a series, said symbols having pre-assigned numerical values consecutively variable throughout the series, printing means for individually recording selected symbols of said series on said base including means defining a printing position for said symbols, displacing means for said support causing the symbols thereon successively to appear in printing position in decreasing order of numerical value, a source of digital electrical data, multi-section counting means actuated by said data for storing a count representing a single, multi-place value of said data, said counting means having a capacity equal to the number of symbols in said series and each section thereof being re-settable upon exceeding by one unit said capacity, means for obtaining a sequence of impulses having a count equal to the count of symbols passing through printing position commencing with the highest in value thereof, and circuit means for applying said impulses to said counting means, said printing means being actuated by each said section upon resetting of each said section to print the symbol then in printing position.

5. In apparatus for recording a multi-digit number corresponding to a single value of digital electrical data the combination of a source of said data, a decade counter having a plurality of counting stages corresponding respectively to the places of said number, means for applying to said counter for storage thereby a sequence of impulses having a count representing a single value of said data, said stages respectively storing the digits of said number, gating means providing a cascade connection of said stages for read-in and isolating said stages one from another for read-out, means for applying in sequence to said gating means read-in and read-out signals respectively determining said two connections, a base displaying digit sequences nine to zero equal in number to the places of said multi-digit number on means for deriving read-out impulses corresponding to the digits in said sequences and for successively applying said impulses to said stages of said counter, and printing means controlled by said stages and actuated upon the completion of read-out of each of said stages.

6. In apparatus for photographically recording a multi-digit number corresponding to an instantaneous value of variable electrical data the combination of means for obtaining a sequence of impulses having a count proportional to said instantaneous value, a decade counter for storing said count, said counter comprising counting stages for individually storing the digits in the respective places of said number, a displaceable base displaying a plurality of sequences of digit symbols nine to zero equal in number and respectively corresponding to the stages of said counter, said symbol sequences extending in a predetermined direction and succeeding one another in laterally staggered relation, photographic printing apparatus cooperative with said base for individually printing selected symbols including means defining a printing position, means for displacing said support in said direction to cause said displayed symbols successively to appear in printing position, gating means for isolating the stages of said counter for read-out, means for generating an impulse synchronously with the appearance of each symbol in printing position, circuit means for individually reading out the stages of said counter by applying the output of said generating means thereto, and means controlled by said stages for actuating said printing apparatus to print the symbol in printing position upon completion of read-out of each counting stage.

7. In computing apparatus means for printing a sequence of symbols comprising the combination of a rotatable cylindrical support displaying a plurality of symbols spaced about the periphery thereof and a plurality of indicia respectively associated therewith and laterally spaced therefrom defining the positions of said symbols, rotating means for said support, record means comprising a photo-sensitive longitudinally displaceable base, displacing means for said base, a phototube, first optical means for selectively projecting an image of a portion of the symbol displaying area of said support onto said base, means defining an aperture limiting said image in the direction of displacement of the symbols to include not more than one complete symbol, second optical means for projecting an image of a portion of the indicia displaying area of said support onto said phototube, means defining a second aperture aligned with said first aperture limiting said last image in the direction of displacement of the indicia to include not more than one complete unit thereof, a multi-stage storage counter, means for supplying first impulses to said counter representing a plurality of symbols to be printed, means controlled by said rotating means for applying the impulses in the output of said phototube responsive to passage of the images of said indicia past said second aperture to each stage of said counter for read-out subsequent to the storage of said first impulses, and means controlled by said counter for operating said first optical means at the completion of read-out of each stage to project the image of a symbol identified thereby upon said record means.

8. In electrical recording apparatus the combination of a multi-stage cyclically operable electronic counter, gating means associated therewith operable to provide a cascade connection of the stages thereof for read-in and for isolating said stages one from another for read-out, means governing said gating means to repeat said two conditions in alternation, means likewise governed by said governing means for synchronously applying read-out impulses to said several stages in read-out condition, and individual symbol printing means controlled by said stages and respectively operable upon the completion of read-out of said stages.

9. In electrical recording apparatus the combination of a multi-stage cyclically operable electronic counter, gating means associated therewith operable to provide a cascade connection of the stages thereof for read-in and for isolating said stages one from another for read-out, means governing said gating means to repeat said two conditions in alternation, symbol printing means controlled by said stages and operable upon the completion of read-out of any of said stages, and means for applying read-out impulses successively to said stages in read-out condition to cause serial operation of said printing means.

10. In apparatus furnishing a printed numerical record of discrete values of variable electrical data the combination of a binary counter including state change means, means for supplying data in digital form to said counter for storage by said counter, timing means, gating means controlled by said timing means and connected to said counter for defining a read-in interval to said counter, means controlled by said timing means and connected to said state change means and operative subsequent to said interval to effect a state change of said counter, a first source of uniformly spaced impulses, means controlled by said timing means and to said source for applying said impulses to said counter subsequent to state change to effect read-out, means for measuring the read-out interval, a second counter, a second source of uniformly spaced impulses connected to the input of said second counter, gating means connected to said second source and controlled by said measuring means for applying impulses from said second source to said second counter during a read-in interval to said second counter equal to said read-out interval, means connected to said second counter for reading out a count stored by said second counter and digit printing means controlled and actuated by said second counter upon the completion of read-out of said second counter.

11. Apparatus for recording symbols comprising symbol printing means, means synchronized with said printing means for generating first impulses indicating the symbol which is in printing position, timing means synchronized with said printing means, an impulse storage counter, said counter having a plurality of stages and first gating means intermediate said last-mentioned stages for alternately connecting said last-mentioned stages in cascade and isolating said last-mentioned stages from each other, said first gating means being connected to said timing means for operation thereby prior to the storage of impulses in said counter for connecting said last-mentioned stages in cascade and said first gating means also being operated by said timing means subsequent to the application of said last-mentioned impulses to said counter for isolating said stages of said counter from each other and said last-mentioned stages each providing an output signal when the number of impulses received thereby exceeds a predetermined number, second gating means controlled by said timing means and connected between said means for generating said first impulses and said last-mentioned stages for applying said first impulses to said last-mentioned stages for read-out and means interconnecting said last-mentioned stages and said printing means for operating said printing means under control of the output signals of said last-mentioned stages.

12. Apparatus for recording symbols comprising symbol printing means, means synchronized with said printing means for generating first impulses indicating the symbol which is in printing position, timing means synchronized with said printing means, a source of second impulses for determining the symbols to be printed, an impulse storage counter connected to said source, said counter having a plurality of stages and first gating means intermediate said last-mentioned stages for alternately connecting said last-mentioned stages in cascade and isolating said last-mentioned stages from each other, said first gating means being connected to said timing means for operation thereby prior to the storage of said second impulses in said counter for connecting said last-mentioned stages in cascade and said first gating means also being operated by said timing means subsequent to the application of said second impulses to said counter for isolating said stages of said counter from each other and said last-mentioned stages each providing an output signal when the number of impulses received thereby exceeds a predetermined number, second gating means controlled by said timing means and connected between said means for generating said first impulses and said last-mentioned stages for applying said first impulses to said last-mentioned stages in succession for read-out and means interconnecting said last-mentioned stages and said printing means for operating said printing means under control of the output signals of said last-mentioned stages.

13. Apparatus for recording symbols comprising symbol printing means, means synchronized with said printing means for generating first impulses indicating the symbol which is in printing position, timing means synchronized with said printing means, a first impulse storage counter having a plurality of stages connected in cascade, said counter providing an output signal when the number of impulses received thereby exceeds a predetermined number, first gating means controlled by said timing means and connected to the input of said counter for controlling the impulses supplied to said counter, a second impulse storage counter having a plurality of stages and second gating means intermediate said last-mentioned stages for alternately connecting said last-mentioned stages in cascade and isolating said last-mentioned stages from each other, said second gating means being connected to said timing means for operation thereby subsequent to the operation of said first gating means said first storage counter for connecting said last-mentioned stages in cascade, a second source of impulses, third gating means connected between said second source and said second counter and controlled by said timing means and said output signal of said first counter for applying read-in impulses to said second counter for a period of time dependent upon the number of impulses stored by said first counter, said second gating means also being operated by said timing means subsequent to the application of said read-in impulses to said second counter for isolating said stages of said second counter from each other and said last-mentioned stages each providing an output signal when the number of impulses received thereby exceeds a predetermined number, fourth gating means controlled by said timing means and connected between said means for generating said first impulses and said last-mentioned stages for applying said first impulses to said last-mentioned stages for read-out and means interconnecting said last-mentioned stages and said printing means for operating said printing means under control of the output signals of said last-mentioned stages.

14. Apparatus for recording symbols comprising symbol printing means, means synchronized with said printing means for generating first impulses indicating the symbol which is in printing position, timing means synchronized with said printing means, a source of second impulses for determining the symbols to be printed, a first source of fixed frequency third impulses, a first impulse storage counter having a plurality of stages connected in cascade, said counter providing an output signal when the number of impulses received thereby exceeds a predetermined number, first gating means jointly controlled by said timing means and said second impulses and connected between said first source and said counter for supplying a number of impulses to said counter from said first source dependent upon a characteristic of said second impulses and the length of operation of said gating means by said timing means, a second impulse storage counter having a plurality of stages and second gating means intermediate said last-mentioned stages for alternately connecting said last-mentioned stages in cascade and isolating said last-mentioned stages from each other, said second gating means being connected to said timing means for operation thereby subsequent to the storage of said third impulses in said first storage counter for connecting said last-mentioned stages in cascade, a second source of fixed frequency impulses and a third source of variable frequency impulses, third gating means connected between said third source and said first counter, fourth gating means connected between said second source and said second counter, said third and fourth gating means being controlled by said timing means and said output signal of said first counter for applying read-out impulses to said first counter and for applying read-in impulses to said second counter for a period of time dependent upon the number of third impulses stored by said first counter, said second gating means also being operated by said timing means subsequent to the application of said read-in impulses to said second counter for isolating said stages of said second counter from each other and said last-mentioned stages each providing an output signal when the number of impulses received thereby exceeds a predetermined number, fifth gating means controlled by said timing means and connected between said means for generating said first impulses and said last-mentioned stages for applying said first impulses to said last-mentioned stages for read-out and means interconnecting said last-mentioned stages and said printing means for operating said printing means under control of the output signals of said last-mentioned stages.

References Cited in the file of this patent

UNITED STATES PATENTS

| | | |
|---|---|---|
| 2,624,507 | Phelps | Jan. 6, 1953 |
| 2,668,870 | Ridler | Feb. 9, 1954 |

FOREIGN PATENTS

| | | |
|---|---|---|
| 664,112 | Great Britain | Jan. 2, 1953 |
| 1,054,234 | France | Oct. 7, 1953 |